United States Patent [19]
Tsai et al.

[11] Patent Number: 5,974,528
[45] Date of Patent: Oct. 26, 1999

[54] MICROCOMPUTER WITH EMBEDDED FLASH MEMORY HAVING ON-CHIP PROGRAMMING CAPABILITY AND METHOD OF PROGRAMMING DATA INTO THE EMBEDDED FLASH MEMORY

[75] Inventors: Hsi-Jung Tsai, Hsinchu Hsien; Fang-Ming Kuo, Yun-Lin, both of Taiwan

[73] Assignee: Winbond Electronics Corp., Taiwan

[21] Appl. No.: 09/111,305

[22] Filed: Jul. 7, 1998

[30] Foreign Application Priority Data

Apr. 17, 1998 [TW] Taiwan .................................. 87105870

[51] Int. Cl.$^6$ ....................................................... G06F 9/06
[52] U.S. Cl. ............................... 712/37; 712/32; 711/101; 711/103; 710/14; 710/36; 710/65; 714/42; 713/1; 713/2
[58] Field of Search .............................. 713/1, 2; 714/42; 710/14, 36, 65; 711/101, 103; 712/32, 37

[56] References Cited

U.S. PATENT DOCUMENTS

| | | | |
|---|---|---|---|
| 5,504,903 | 4/1996 | Chen et al. | 713/1 |
| 5,678,082 | 10/1997 | Miyazawa et al. | 396/300 |
| 5,818,755 | 10/1998 | Koyanagi et al. | 365/185.11 |
| 5,841,996 | 11/1998 | Nolan et al. | 710/129 |
| 5,848,026 | 12/1998 | Ramamurthy et al. | 365/238.5 |
| 5,894,549 | 4/1999 | Cheng | 714/42 |

*Primary Examiner*—Meng-Ai T. An
*Assistant Examiner*—Nabil El-Hady
*Attorney, Agent, or Firm*—Thomas, Kayden, Hostemeyer & Risley, LLP

[57] ABSTRACT

A microcomputer with embedded flash memory is provided, which has an on-chip programming capability that allows new data to be reprogrammed by the microcomputer itself into the embedded flash memory, without having to use external reprogramming tools. Moreover, a method is provided for programming data into the embedded flash memory of the microcomputer. The microcomputer includes a microprocessor unit, an embedded flash memory unit, a register set, and a bus multiplexer. The embedded flash memory unit is partitioned into a loader block for storing a loader program and a user block for storing at least one user application program. The new data that are to be programmed into the user block of the embedded flash memory unit are first transferred to and stored in the register set. In the embedded flash memory unit, only one of the loader block and the user block can be in active operation, which is controlled by the microprocessor unit. The microcomputer allows an on-chip programming process that allows the developer to update or change the old program data stored in the user block of the embedded flash memory unit more easily and cost-effectively, and without having to use external reprogramming tools.

33 Claims, 7 Drawing Sheets

MICROCOMPUTER WITH EMBEDDED FLASH MEMORY HAVING ON-CHIP PROGRAMMING CAPABILITY AND METHOD OF PROGRAMMING DATA INTO THE EMBEDDED FLASH MEMORY

CROSS-REFERENCE TO RELATED APPLICATION

This application claims the priority benefit of Taiwan application serial no. 87105870, filed Apr. 17, 1998, the full disclosure of which is incorporated herein by reference.

BACKGROUND OF THE INVENTION

1. Field of the Invention

This invention relates to microcomputers with embedded flash memory, and more particularly, to a microcomputer with embedded flash memory that can be reprogrammed through the microcomputer itself without having to use external programming tools. Moreover, the invention relates to a method of programming data into the embedded flash memory of the microcomputer.

2. Description of Related Art

A microcomputer is a monolithic integrated circuit with a complete microprocessor unit and an embedded flash memory unit. The entire microcomputer can be considered as a "computer on a chip", which is very compact in size and highly integrated in functionality. Unlike EEPROM (electrically erasable and programmable read-only memory), the embedded flash memory in a microcomputer can be reprogrammed without the use of ultraviolet light. Flash memory is therefore more popular than EEPROM for use as the embedded memory in microprocessors.

Conventionally, data is programmed into the embedded flash memory of a microcomputer by external programming tools and cannot be carried out directly by the microcomputer itself. Therefore, it is very inconvenient to update or change the program codes previously programmed into the embedded flash memory, in the event that bugs are found or new functions are to be added.

In some conventional designs, the microprocessor unit and the embedded flash memory in the microcomputer are separated rather than integrated on the same chip so as to allow the microcomputer to have an on-line programming capability. This design scheme, however, requires additional control circuitry and an external memory unit to implement. This makes the overall system architecture of the microcomputer more complex, considerably larger in size, and low in integration. Such a microcomputer is be more difficult and thus more costly to manufacture.

FIG. 1 is a schematic block diagram showing the basic architecture of a conventional microcomputer with embedded flash memory. As shown, the microcomputer includes a microprocessor unit 110 and a bank of embedded flash memory 130 connected via a bus 120 to the microprocessor unit 110. The embedded flash memory 130 is used to store the programs that are to be executed by the microprocessor unit 110 for specific purposes. One drawback to this microcomputer architecture, however, is that it includes only a single bank of embedded flash memory, which is insufficient if the microcomputer is to properly perform an on-chip programming process. This is because that during the on-chip programming process, the microprocessor unit 110 needs to perform both write and read operations on the embedded flash memory 130, and the provision of only one single bank of embedded flash memory does not allow the microcomputer to do this in an efficient manner.

To allow the microcomputer to have on-chip programming capability, a conventional solution is to provide an additional ROM (read-only memory) unit in the microcomputer for storing the loader program that is used to control the loading of data into the embedded flash memory. This design scheme, however, requires the fabrication of two different semiconductor memory structures, i.e., a flash memory structure and a ROM structure, and two different peripheral circuits for the flash memory and the ROM in the IC chip of the microcomputer, respectively. This makes both the design and the fabrication of the microcomputer considerably more difficult to carry out.

In conclusion, the prior art of FIG. 1 has the following drawbacks.

(1) First, since the prior art includes only one single bank of embedded flash memory, it does not allow the microcomputer to have an on-chip programming capability to program new data into the embedded flash memory. Instead, the on-chip programming process requires the use of an external programming tool, which is inconvenient and cost-ineffective, with regard to the use of the microcomputer.

(2) Second, in order to allow the microcomputer to have an on-chip programming capability, the microprocessor unit and the embedded flash memory in the microcomputer should be separated rather than integrated on the same chip and require respective peripheral circuits for proper operation. This leads to low integration, large size, and costly implementation.

(3) Third, although the on-chip programming capability can be provided by incorporating an additional ROM unit in the microcomputer for storing the loader program, it nonetheless leads to low integration, large size, and costly implementation. Moreover, both design and debugging are more difficult to carry out by the developer.

SUMMARY OF THE INVENTION

It is therefore an objective of the present invention to provide a microcomputer with an embedded flash memory, which has an on-chip programming capability that allows the reprogramming of new data into the embedded flash memory to be carried out through the microcomputer itself and without the need to use external programming tools.

It is another objective of the present invention to provide a microcomputer with embedded flash memory, which includes two flash memory blocks used respectively to store the application programs and the loader program, of which the loader program can be executed by the microprocessor unit of the microcomputer so as to control the programming of data into the embedded flash memory.

It is still another objective of the present invention to provide a microcomputer with an embedded flash memory, which allows the developer to program updated or new data into the embedded flash memory of the microcomputer any time during the development or after sale, without having to use an external programming tool.

It is yet another objective of the present invention to provide a microcomputer with embedded flash memory, whose architecture allows the microcomputer to be realized with a smaller layout area, thus leading to the benefits of high integration, compactness, and cost-effective implementation, which also allows the microcomputer to be easier to design and debug.

In accordance with the foregoing and other objectives of the present invention, a new architecture for a microcomputer with embedded flash memory is provided. The microcomputer of the invention includes a microprocessor unit, an embedded flash memory unit, a register set, and a bus multiplexer. These components are interconnected via a data bus.

The embedded flash memory unit is partitioned into a loader block for storing a loader program and a user block for storing at least one user application program. The new data that are to be programmed into the user block of the embedded flash memory unit are first stored in the register set. In the embedded flash memory unit, only one of the loader block and the user block can be in active operation, which is controlled by a memory selection signal from the microprocessor unit. Moreover, the bus multiplexer is controlled by a bus selection signal from the microprocessor unit to selectively connect the active block of the embedded flash memory unit, whether the loader block or the user block determined by the memory selection signal, to either the microprocessor unit or the register set. The microprocessor unit includes a timer that generates an interrupt signal when the preset time elapses. The microprocessor unit operates in an idle mode, in which the microprocessor unit temporarily stops operation.

In accordance with the invention, two preferred embodiments are disclosed. In accordance with the first preferred embodiment, the microcomputer of the invention includes the following constituent elements: an embedded flash memory, a microprocessor unit, a register set, and a bus multiplexer. The embedded flash memory unit is partitioned into at least two blocks including: a loader block for storing a loader program and a user block, having the same starting address as the loader block, for storing at least one application program. The microprocessor unit is coupled to the embedded flash memory unit, and includes a timer that is capable of generating an interrupt signal when a preset period of time elapses. The register set temporarily stores the data to be programmed into the user block of the embedded flash memory unit. The bus multiplexer is coupled between the microprocessor unit, the embedded flash memory unit, and the register set, in order to selectively connect the embedded flash memory unit to either the microprocessor unit or the register set in response to a bus selection signal issued by the microprocessor unit.

When a data reprogramming process is performed in the foregoing microcomputer, the microprocessor unit selects the loader block of the embedded flash memory unit as the active block. Meanwhile, the microprocessor instructs the bus multiplexer to connect the loader block of the embedded flash memory unit to the microprocessor unit, to allow the microprocessor unit to fetch and execute the loader program stored in the loader block of the embedded flash memory unit.

In the data reprogramming process, the received data are first transferred to and temporarily stored in the register set and the period of time required to write one block of data into the user block of the embedded flash memory unit is used set to the timer in the microprocessor unit. Subsequently, the microprocessor unit is switched to idle mode and then selects the user block of the embedded flash memory unit as the active block. Meanwhile, the microprocessor unit also instructs the bus multiplexer to connect the user block of the embedded flash memory unit to the register set, allowing the data currently stored in the register set to be transferred to and written into the user block of the embedded flash memory unit. When the preset period of time elapses, the timer generates an interrupt signal. The interrupt signal causes the microprocessor unit to wake up from the idle mode and resume operation. In accordance with the second preferred embodiment, the microcomputer of the invention includes the following constituent elements: an embedded flash memory unit, a microprocessor unit, a register set and a bus multiplexer. The embedded flash memory unit is partitioned into at least two blocks including a loader block for storing a loader program and a user block, which has a starting address following immediately after the last address of the loader block, for storing at least one application program. The microprocessor unit is coupled to the embedded flash memory unit, and the microprocessor unit includes a timer capable of generating an interrupt signal when a preset time elapses. The register set temporarily stores the data to be programmed into the user block of the embedded flash memory unit. The bus multiplexer is coupled between the microprocessor unit, the embedded flash memory unit, and the register set, in order to selectively connecting the embedded flash memory unit to either the microprocessor unit or the register set in response to a bus selection signal issued by the microprocessor unit.

In the first preferred embodiment, the loader block and the user block have the same starting address and are selectively switched as the active block by the memory selection signal from the microprocessor unit. In the second preferred embodiment, however, the loader block and the user block are continuously coupled in address, i.e., the starting address of the user block follows immediately the last address of the loader block.

In both preferred embodiments, the register set includes: a data register for storing the data to be programmed into the user block of the embedded flash memory unit, an address register for storing the associated addresses of the data to be programmed into the user block of the embedded flash memory unit and a control register for storing the control instructions related to the programming of the data into the user block of the embedded flash memory unit.

In addition, the invention provides a method for use on a microcomputer, which has a microprocessor unit and an embedded flash memory unit, to perform a data reprogramming process for programming a set of new data into the embedded flash memory unit.

The method of the invention comprises the steps of:

(1) partitioning the embedded flash memory unit into a loader block for storing a loader program and a user block for storing at least one application program;

(2) switching the microprocessor unit to programming mode;

(3) executing the loader program stored in the loader block of the embedded flash memory unit;

(4) setting parameters related to the programming of the new data into the embedded flash memory unit;

(5) receiving one block of the new data;

(6) writing the currently received block of data into the user block of the microprocessor unit; and (7) checking whether all the blocks of the new data have been programmed into the user block of the embedded flash memory unit; if not, returning to the step (5).

The method of the invention further comprises the step of checking whether a request for data reprogramming process is received; if not, the microprocessor unit is instructed to execute the application program stored in the user block of the embedded flash memory unit.

The step (5) comprises the substep of writing the new data and the address values associated with the new data into a register set. The new data are received first via an I/O port of the microprocessor unit and then transferred to the register set.

Still moreover, the method of the invention further comprises the steps of: checking the period of time required to program one block of data into the user block of the microprocessor unit; and setting a timer in the microprocessor unit with the period of time, the timer being capable of generating an interrupt signal to the microprocessor unit when the preset period of time elapses after the timer is started.

The step (2) of switching the microprocessor unit to programming mode includes the substeps of:

initializing the programming mode;

enabling the interrupt function of the microprocessor unit;

setting the timer;

starting the timer;

switching the microprocessor unit into idle mode;

upon receiving the interrupt signal from the timer, waking up the microprocessor unit from the idle mode;

stopping the timer; and disabling the interrupt function of the microprocessor unit.

Moreover, the method of the invention further includes, before the step (4) of setting parameters, the step of checking whether the programming mode is readily entered. If it is not, the programming mode is reinitialized.

The step (6) of writing data includes the substeps of:

enabling the interrupt function of the microprocessor unit;

starting the timer;

switching the microprocessor unit into idle mode;

transferring the data currently stored in the register set to the user block of the embedded flash memory unit, and then writing these data into the user block of the embedded flash memory unit;

upon receiving the interrupt signal from the timer, waking up the microprocessor unit from the idle mode;

stopping the timer; and disabling the interrupt function of the microprocessor unit.

After this, the procedure returns to the main program to receive and write the next block of data, if any, into the user block of the embedded flash memory unit.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
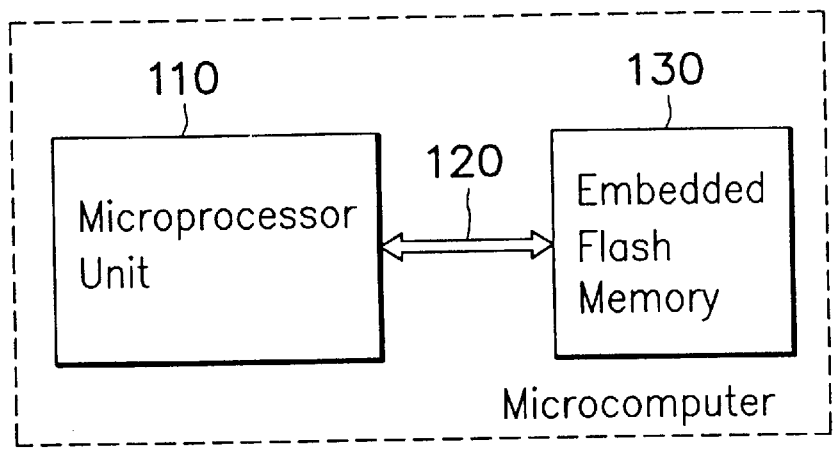
FIG. 1 is a schematic block diagram showing the basic architecture of a conventional microcomputer with embedded flash memory.
Figure 2:
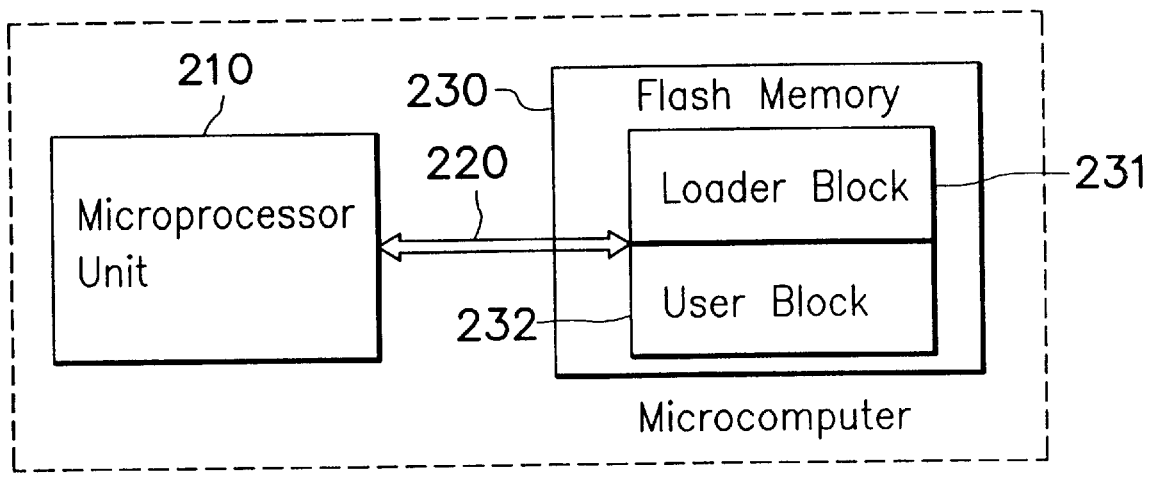
FIG. 2 is a schematic block diagram showing the basic architecture of the microcomputer with embedded flash memory according to the invention.

FIG. 2 is a schematic block diagram showing the basic architecture of the microcomputer with embedded flash memory, according to the invention. As shown, the microcomputer of the invention includes a microprocessor unit 210 and an embedded flash memory unit 230 connected via a data bus 220 to the microprocessor unit 210. In accordance with the invention, the embedded flash memory unit 230 is partitioned into two blocks: a loader block 231 and a user block 232. The loader block 231 is used to store the loader program that is used to perform the data loading function, while the user block 232 is used to store various application programs that are specific in function to the microcomputer.

When the microcomputer is started, it executes the application programs stored in the user block 232 to provide specific functions to the system connected to the microcomputer. When the microcomputer receives an externally issued request to perform a data reprogramming process for programming new data into the user block 232 of the embedded flash memory unit 230, it first connects the data bus 220 to the loader block 231 of the embedded flash memory unit 230 so as to execute the loader program stored in the loader block 231. In this process, the new program code is loaded into the microcomputer from external circuitry, and then the old data in the user block 232 are erased, and then the new data are written into the user block 232. After this, the microprocessor unit 210 connects the data bus 220 back to the user block 232, allowing the microprocessor unit 210 to execute the new program code which is now stored in the user block 232.

In conventional microcomputers, the period of time required to execute one write instruction is typically much shorter than the period of time required to program a block of data into the embedded flash memory. Therefore, it is impossible to finish programming data into the embedded flash memory within the cycle of the executing of one writing instruction. For example, in a 40 MHz microprocessor, it takes two instruction cycles to execute the following instruction:

$$MOVX@DPTR, A$$

One instruction cycle is equal to 12 clock periods. Therefore, it takes 12*2*25=600 ns (nanosecond) to execute the above instruction. Further, since about 150 $\mu s$ (microsecond) are required to program each byte of data into the embedded flash memory, the microcomputer is still unable to complete the data reprogramming process within one instruction cycle. The program code stored in the embedded flash memory cannot be accessed until the data reprogramming process is completed. Therefore, the microprocessor unit pauses until the programming process is completed. After the programming process is completed, the microprocessor unit can then gain access to the next instruction in the embedded flash memory to perform the subsequent task.

First Preferred Embodiment

Figure 3:
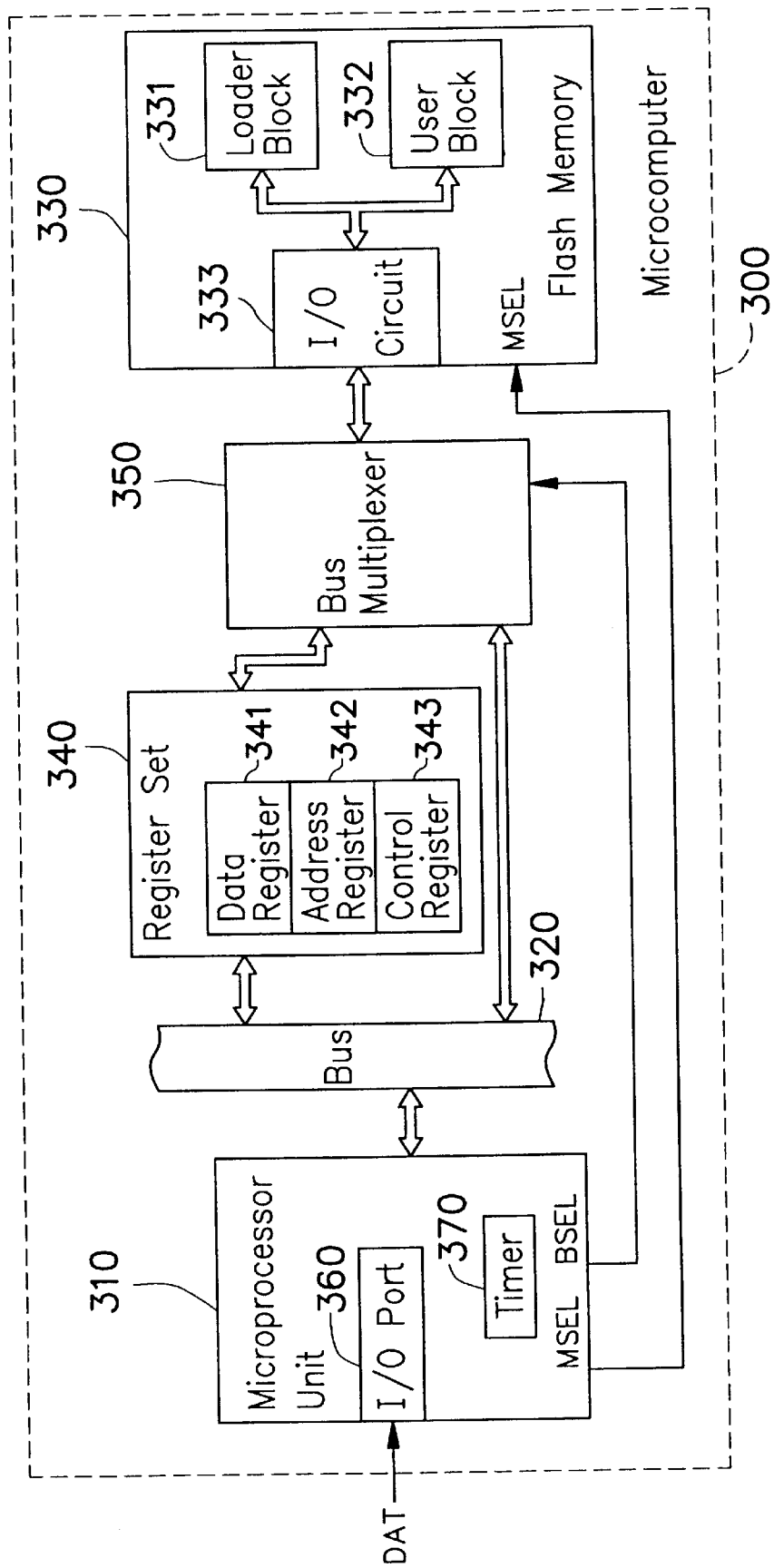
FIG. 3 is a schematic block diagram showing the first preferred embodiment of the microcomputer of the invention.

FIG. 3 is a schematic block diagram showing the detailed architecture of a first preferred embodiment of the microcomputer according to the invention. As shown, the microcomputer of this embodiment includes a microprocessor unit 310 (the microprocessor unit 210 shown in FIG. 2), a data bus 320, an embedded flash memory unit 330 (the embedded flash memory unit 230 shown in FIG. 2), a register set 340, and a bus multiplexer 350.

The microprocessor unit 310 further includes an I/O port 360, a timer 370, an output port MSEL for outputting a memory selection signal MSEL, and an output port BSEL for outputting a bus selection signal BSEL. The I/O port 360 is used to receive a stream of new data DAT that is to be programmed into the microcomputer. The embedded flash memory unit 330 is partitioned into a loader block 331 and a user block 332, and the loader block 331 and the user block 332 share a common I/O circuit 333 for I/O functions. The register set 340 includes a data register 341, an address register 342, and a control register 343.

In the embedded flash memory unit 330, the I/O circuit 333 includes an address decoder, a charger pumper, and a control logic circuit (all not shown), which take up quite a large area in the IC chip layout. Therefore, in order to allow the overall chip size to be small, the I/O circuit 333 is designed in such a manner as to allow the loader block 331 and the user block 332 to share it for I/O functions with other components in the microcomputer. In this preferred embodiment, the starting address in the loader block 331 and the starting address in the user block 332 are identical in value, for example 00 h. In other words, the loader block 331 and the user block 332 operate in a time-sharing manner, and whichever one of them is actively operating is controlled by the memory selection signal MSEL issued from the microprocessor unit 310.

When performance of a data reprogramming process is desired, the related instructions are loaded into the microprocessor unit 310, causing the microprocessor unit 310 to select the loader block 331 as the active block of the embedded flash memory unit 330 so as to execute the loader program stored in the loader block 331.

The loader program allows the microprocessor unit 310 to receive the new data DAT that are to be programmed into the user block 332 of the embedded flash memory unit 330 via the I/O port 360. The new data and associated address values and control instructions are first transferred to the register set 340, and stored respectively in the data register 341, the address register 342, and the control register 343 of the register set 340.

Subsequently, the period of time required to program one block of data into the user block 332 of the embedded flash memory unit 330 is checked, which is then used to set the timer 370 accordingly. The timer 370 generates an interrupt signal that can interrupt the microprocessor unit 310 when the preset period of time elapses after being started. Once the data reprogramming process is started, the timer 370 is also started and the microprocessor unit 310 is switched to the idle mode. Moreover, the logic states of MSEL and BSEL are switched in such a manner as to respectively switch the active block of the embedded flash memory unit 330 to the user block 332 and cause the bus multiplexer 350 to connect the I/O circuit 333 of the embedded flash memory unit 330 to the register set 340. This allows the data currently stored in the register set 340 (i.e., the new data that are to programmed into the user block 332 of the embedded flash memory unit 330) to be transferred via the bus multiplexer 350 to the user block 332, whereby the new data are written into the user block 332.

When the microprocessor unit 310 operates in the idle mode, the data stored in the register set 340 are transferred to and written into the user block 332 of the embedded flash memory unit 330. As the timer 370 reaches the preset time, it generates an interrupt signal that can cause the microprocessor unit 310 to wake up from the idle mode, and also causes the logic states of MSEL and BSEL to change in such a manner as to respectively switch the active block of the embedded flash memory unit 330 back to the loader block 331 and cause the bus multiplexer 350 to connect the I/O circuit 333 of the embedded flash memory unit 330 to the data bus 320. This allows the microprocessor unit 310 to fetch and execute the loader program stored in the loader block 331 so as to receive and prepare to program the next block of the new data into the user block 332 of the embedded flash memory unit 330. The foregoing procedure is repeated until all the blocks of the new data are programmed into the user block 332.

When all of the blocks of the new data have been programmed into the user block 332 of the embedded flash memory unit 330, the logic states of MSEL and BSEL are changed in such a manner as to respectively switch the active block of the embedded flash memory unit 330 to the user block 332 and cause the bus multiplexer 350 to connect the I/O circuit 333 of the embedded flash memory unit 330 to the data bus 320. This allows the microprocessor unit 310 to execute the new programs that are now stored in the user block 332 of the embedded flash memory unit 330 from the foregoing data reprogramming process.

Figure 4:
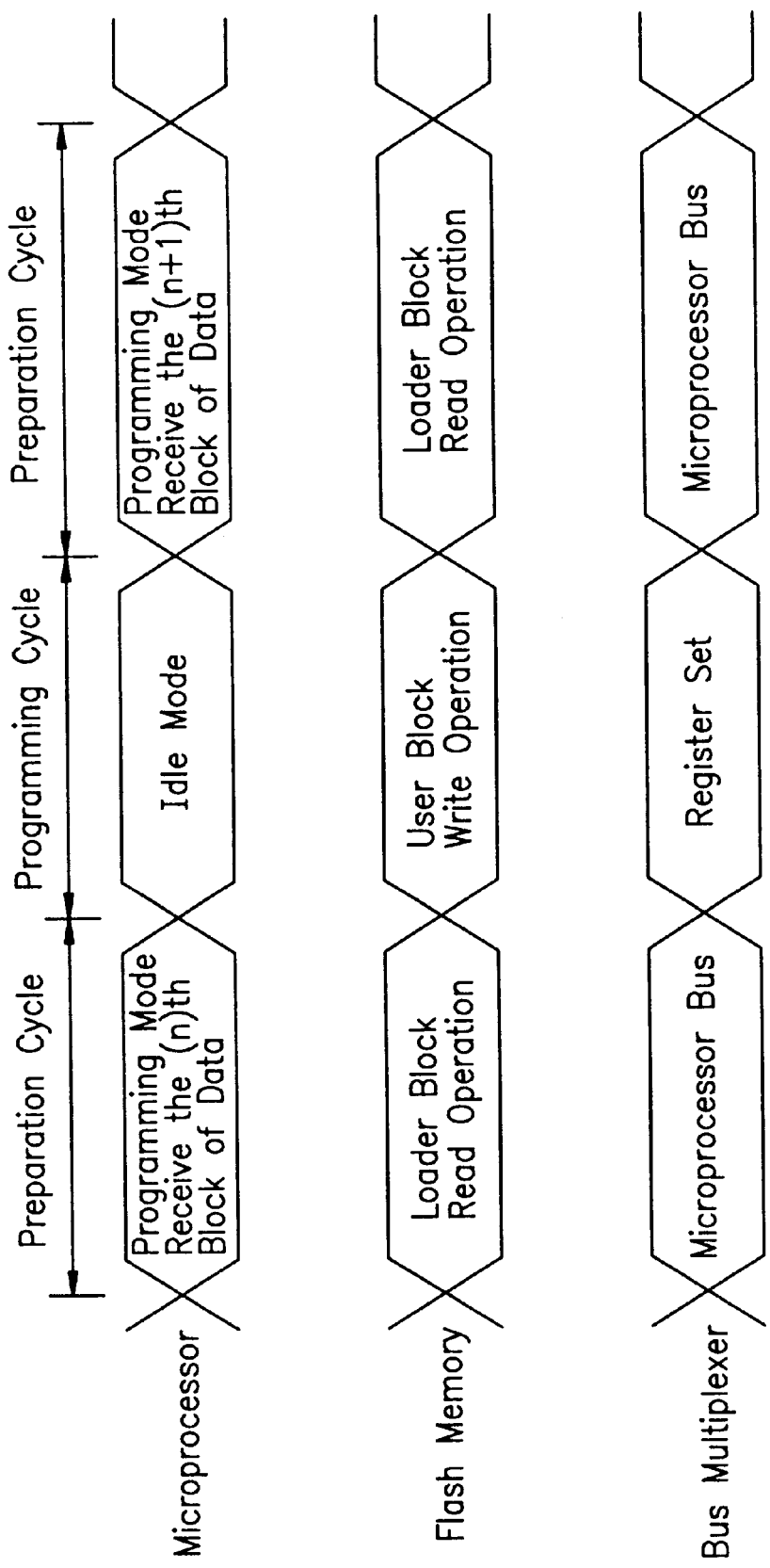
FIG. 4 is a schematic diagram showing the timing relationships between various operations in the microcomputer of the invention when performing a data reprogramming process to program new data into the embedded flash memory.

FIG. 4 is a schematic diagram showing the timing relationships between various operations in the microcomputer of the invention when performing a data reprogramming process to program new data into the user block 332 of the embedded flash memory unit 330. Each data reprogramming process includes two phases: a preparation phase and a programming phase.

In the preparation phase, the microprocessor unit 3 10 selects the loader block 331 as the active block of the embedded flash memory unit 330, and simultaneously instructs the bus multiplexer 350 to connect the I/O circuit 333 of the embedded flash memory unit 330 to the data bus 320. This allows the microprocessor unit 310 to fetch and execute the loader program stored in the loader block 331, whereby the new data are received via the I/O port 360 and transferred to the register set 340. Moreover, the instructions used to control the programming process are set in the control register 343.

The programming phase is carried out after the preparation phase is completed and the microprocessor unit 310 is switched into the idle mode. In the programming phase, the microprocessor unit 310 selects the user block 332 as the active block of the embedded flash memory unit 330, and meanwhile instructs the bus multiplexer 350 to connect the I/O circuit 333 of the embedded flash memory unit 330 to the register set 340. This allows the data currently stored in the register set 340 (i.e., the new data that are to be programmed into the embedded flash memory unit 330) to be transferred via the bus multiplexer 350 to the user block 332 of the embedded flash memory unit 330. After a preset time when the programming phase is completed, the timer 370 issues an interrupt signal that wakes up the microprocessor unit 310 from the idle mode. This allows the microprocessor unit 310 to prepare to receive and program the next block of data into the user block 332 of the embedded flash memory unit 330.

Figure 5:
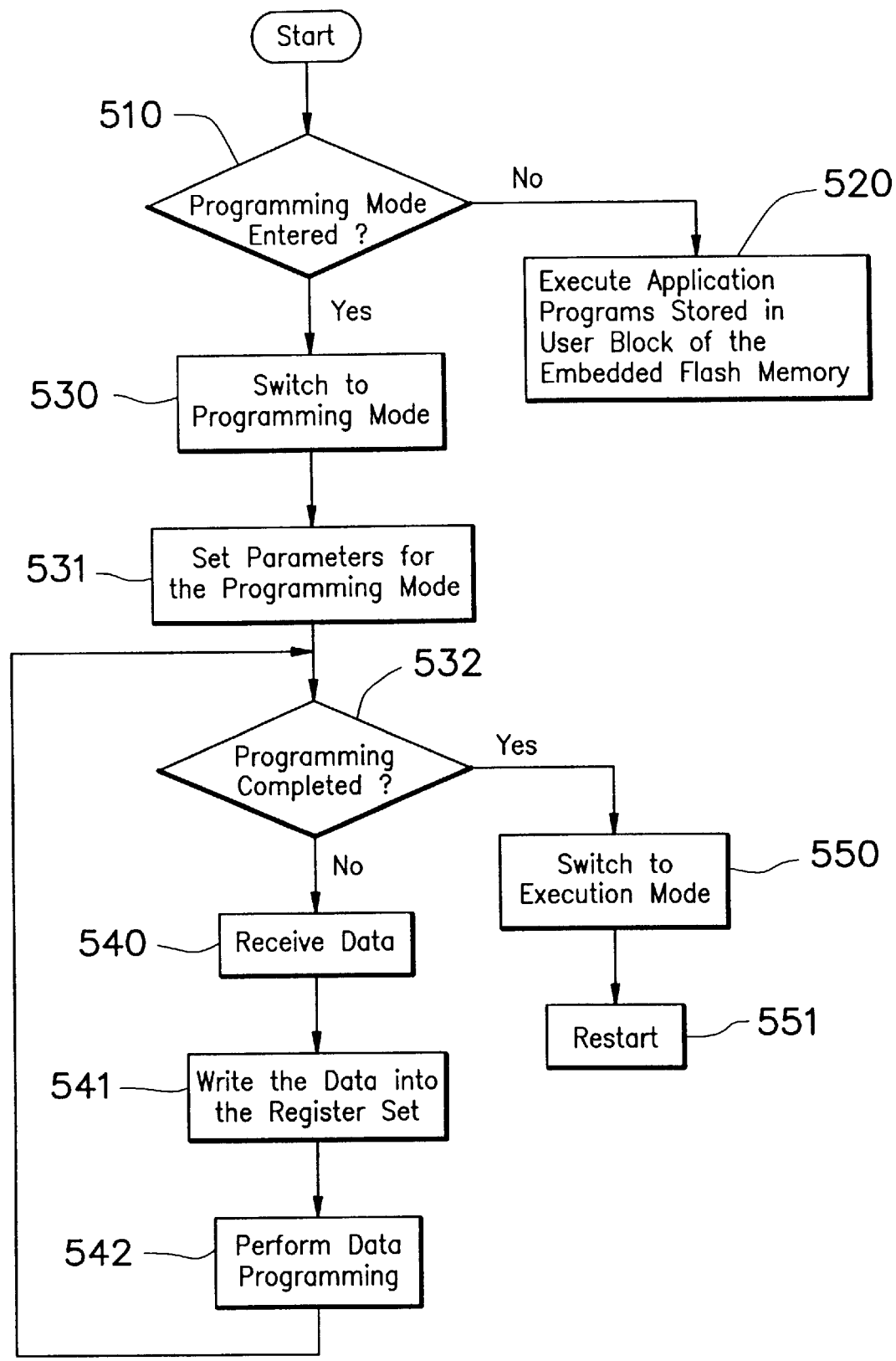
FIG. 5 is a flow diagram showing the procedural steps involved in the main program carried out by the microcomputer of the invention to perform a data reprogramming process.
Figure 6:
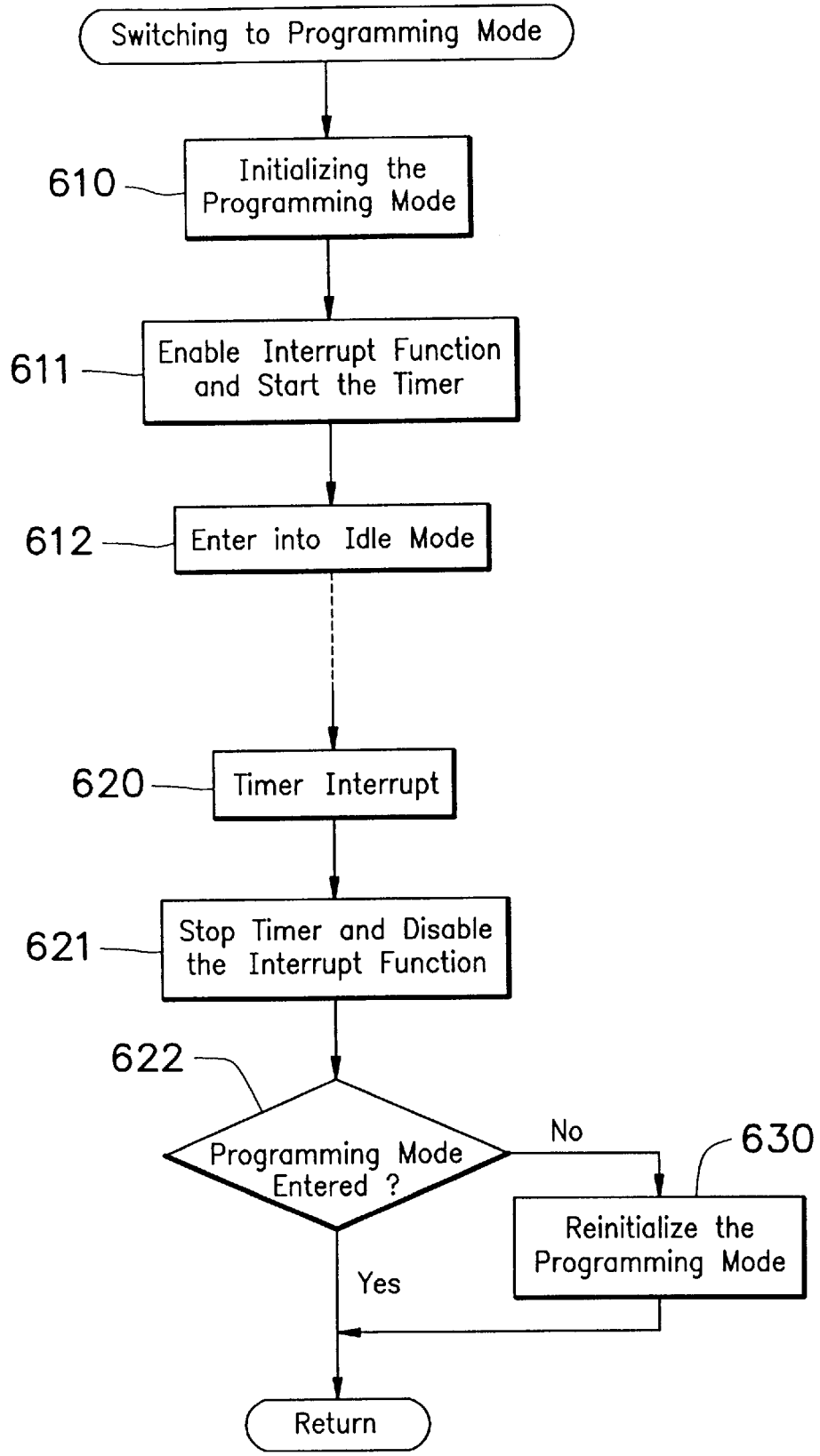
FIG. 6 is a flow diagram showing the procedural steps involved in a switching subroutine to the main program of FIG. 5.
Figure 7:
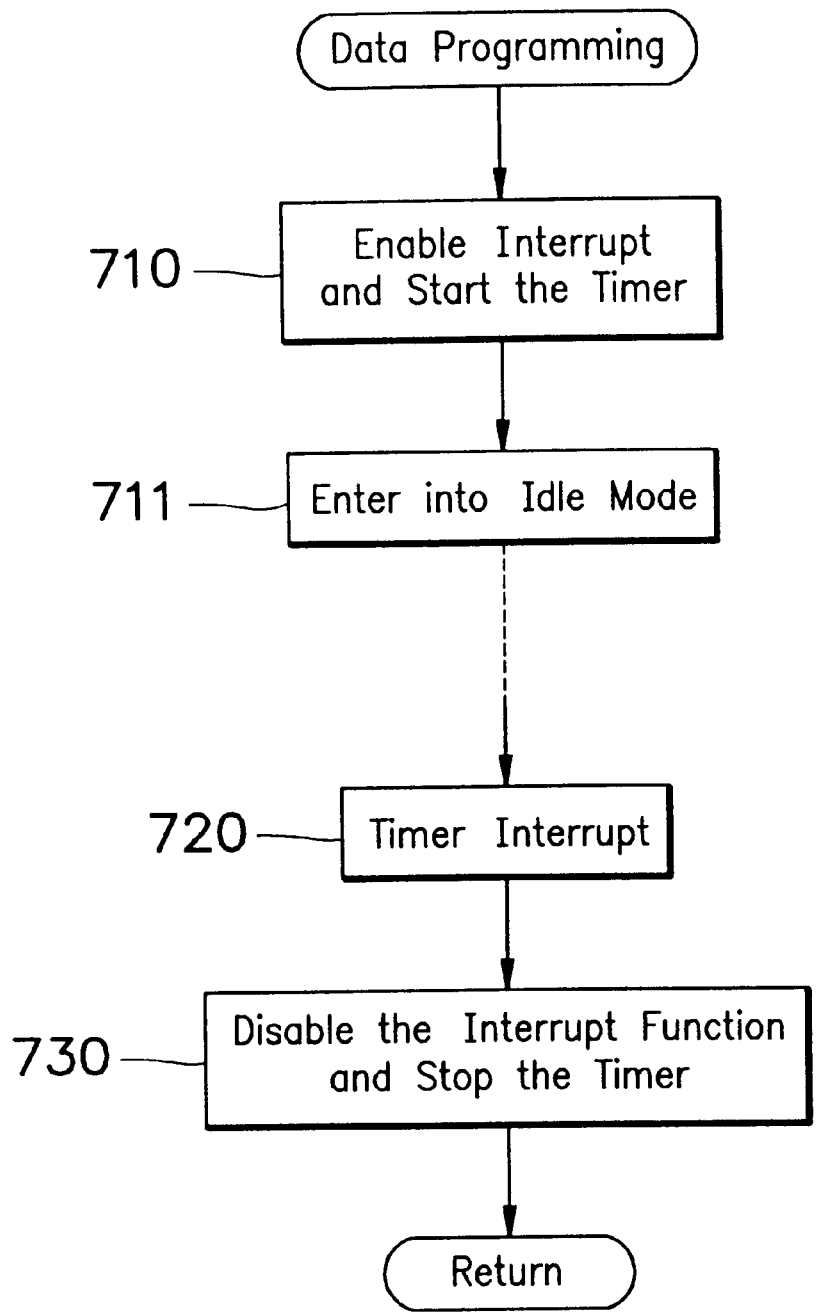
FIG. 7 is a flow diagram showing the procedural steps involved in a write subroutine to the main program of FIG. 5, which is used to write each block of the new data into the embedded flash memory.

FIGS. 5–7 are flow diagrams showing the procedural steps involved in the data reprogramming process to program data into the embedded flash memory unit 330. FIG. 5 is a flow diagram that shows the procedural steps involved in the main program carried out by the microcomputer of the invention to perform a data reprogramming process. FIG. 6 is a flow diagram that shows the procedural steps involved in a switching subroutine to the main program of FIG. 5. FIG. 7 is a flow diagram that shows the procedural steps involved in a write subroutine to the main program of FIG. 5, which is used to write each block of the new data into the embedded flash memory.

When a data reprogramming process is requested, the microcomputer of the invention performs the main program of FIG. 5 to program the new data into the user block 332 of the embedded flash memory unit 330.

In the first step 510, the microprocessor unit 310 checks whether a request for data reprogramming process is received from external circuitry or settings. If NO, the procedure goes to the step 520 to execute the applications programs stored in the user block 332 of the embedded flash memory unit 330. If YES, the procedure goes to step 530.

In step 530, the microprocessor unit 310 is switched to the programming mode, in which the active block of the embedded flash memory unit 330 is switched to the loader block 331. During this switching process, some flags in the microprocessor unit 310 are set to indicate the current status. The use of flags in a microprocessor to indicate the current status is a well-known art, so description of this procedure will not be further detailed.

In the subsequent step 530, the main program checks the period of time required to write one block of data into the user block 332 of the embedded flash memory unit 330 and the total amount of the new data that is to be programmed into the user block 332 of the embedded flash memory unit 330. The obtained period of time is then used to set the timer 370 in the microprocessor unit 310.

The procedure then goes to the next step 532, in which the microprocessor unit 310 receives the current block of the new data and program this block of data into the user block 332 of the embedded flash memory unit 330. When the programming of the current block of data is completed, the microprocessor unit 310 checks whether all the blocks of the new data are finished. If NO, the procedure goes to step 540. If YES, the procedure goes to step 550.

In step 550, the microprocessor unit 310 is switched to the execution mode. In the subsequent step 551, the active block of the embedded flash memory unit 330 is switched to the user block 332. This allows the microprocessor unit 310 to execute the application programs stored in the user block 332 of the embedded flash memory unit 330.

In step 540, the microprocessor unit 310 receives the next block of the new data via the I/O port 360. In the subsequent step 541, this block of data is transferred to and temporarily stored in the register set 340. In the subsequent step 542, the data stored in the register set 340 are transferred to and written into specific locations in the user block 332 of the embedded flash memory unit 330. After this, the procedure returns to step 532 to repeat step 532 again. The loop from step 532 to step 542 is repeated until all the blocks of the new data have been received and programmed into the user block 332 of the embedded flash memory unit 330.

In the flow diagram of FIG. 5, step 530 of switching to the programming mode involves a switching subroutine whose procedural steps are shown in the flow diagram of FIG. 6.

In step 610, the microprocessor unit 310 sets those flags and control instructions that are related to the programming mode.

In the subsequent step 611, the switching subroutine enables the interrupt function of the microprocessor unit 310, thereby allowing the microprocessor unit 310 to respond to the interrupt signal later generated by the timer 370. The timer 370 is set to generate the interrupt signal when a preset period of time elapses after the timer 370 is started. As mentioned earlier, the preset period of time for the timer 370 is equal to the period of time required to write one block of data into the user block 332 of the embedded flash memory unit 330. In the subsequent step 612, the timer 370 is started, and the microprocessor unit 310 is switched into the idle mode. The timer 370 generates an interrupt signal when the preset time period elapses.

In the subsequent step 620, the interrupt signal generated by the timer 370 causes the microprocessor unit 310 to wake up from the idle mode, and thereby resume operation.

In the subsequent step 621, the switching subroutine stops the timer 370 and also disables the interrupt function of the microprocessor unit 310, causing the microprocessor unit 310 to reject any subsequent interrupt signals.

In the subsequent step 622, the switching subroutine checks whether the microprocessor unit 310 has been switched to the programming mode. If YES, the switching subroutine returns to the main program of FIG. 5; otherwise, if NO, the switching subroutine goes to step 630, in which the microprocessor unit 310 is switched to the programming mode.

Further, in the main program of FIG. 5, step 542 of transferring and writing the data temporarily stored in the register set 340 into the user block 332 of the embedded flash memory unit 330 involves a write subroutine whose procedural steps are shown in the flow diagram of FIG. 7.

In the first step 710, the write subroutine enables the interrupt function of the microprocessor unit 310 and starts the timer 370. At this time, the timer 370 is already set (in the step 531 shown in FIG. 5) to generate an interrupt signal to the microprocessor unit 310 when the preset time period elapses after the timer 370 is started. As mentioned earlier, the preset time period for the timer 370 is equal to the time period required to write one block of data into the user block 332 of the embedded flash memory unit 330.

In the subsequent step 711, the write subroutine switches the microprocessor unit 310 into idle mode and changes the logic states of MSEL and BSEL in such a manner as to respectively switch the active block of the embedded flash memory unit 330 to the user block 332 and cause the bus multiplexer 350 to connect the I/O circuit 333 of the embedded flash memory unit 330 to the register set 340. This allows the data currently stored in the register set 340 to be transferred and written via the bus multiplexer 350 into the user block 332 of the embedded flash memory unit 330.

In the subsequent step 720, the interrupt signal generated by the timer 370 causes the microprocessor unit 310 to wake up from the idle mode and resume operation. At this time, the current block of data has been completely written into the user block 332 of the embedded flash memory unit 330.

In the subsequent step 730, the write subroutine disables the interrupt function of the microprocessor unit 310 and stops the timer 370. The write subroutine then returns to the main program of FIG. 5 to receive and program the next block of the new data into the user block 332 of the embedded flash memory unit 330.

Second Preferred Embodiment

Figure 8:
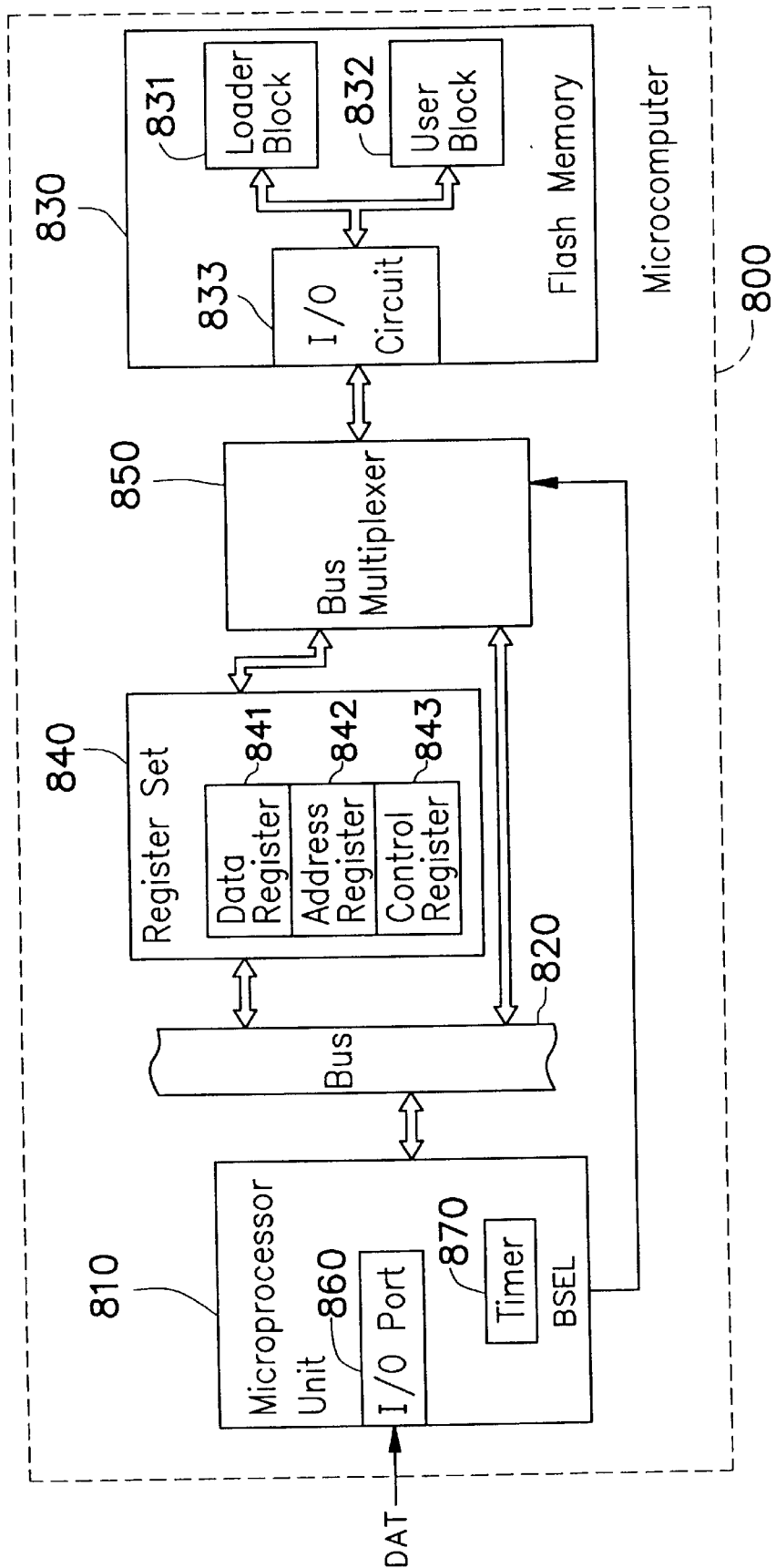
FIG. 8 is a schematic block diagram showing a second preferred embodiment of the microcomputer with embedded flash memory according to the invention.

FIG. 8 is a schematic block diagram showing the detailed architecture of a second preferred embodiment of the microcomputer according to the invention. This embodiment is substantially identical in architecture as the previous embodiment of FIG. 3, with the constituent components here being labeled with different reference numerals that begin with 8 instead of 3. In the previous embodiment of FIG. 3, the loader block 331 and the user block 332 in the embedded flash memory unit 330 of the previous embodiment of FIG. 3 have the same starting address, for example 00 h, and share the same I/O circuit 333. One of them is active and is controlled by the memory selection signal MSEL issued by the microprocessor unit 310.

In this embodiment, however, the loader block (here designated instead by 831) and the user block (here designated instead by 832) in the embedded flash memory unit (here designated instead by 830) are consecutively coupled together in address. In other words, the starting address of one block follows immediately after the last address of the other block.

For example, assume the user block 832 has a memory capacity of XXh bytes that starts at 00 h and ends at XXh-1; then the loader block 831 starts at XXh in address. Instead of using the memory selection signal MSEL, either the loader block 331 or the user block 332 of the embedded flash memory unit 330 is here accessed directly by the address signal issued by the microprocessor unit 810. For example, when it is necessary to allow the microprocessor unit 810 to execute the loader program stored in the loader block 831, the microprocessor unit 810 can issue an address signal representative of the starting address of the loader block 831 to the embedded flash memory unit 830. In this manner, microprocessor 810 gains direct access to the loader block 831. On the other hand, when it is desired to write data into the user block 832, the microprocessor unit 810 can issue an address signal representative of the starting address of the user block 332 to the embedded flash memory unit 830 and gain direct access to the user block 332. The MSEL signal line and output port shown in FIG. 3 are here eliminated. Other operations are the same as the previous embodiment of FIG. 3 so description thereof will not be further detailed.

In conclusion, the microcomputer with embedded flash memory according to the invention has the following advantages over the prior art.

(1) First, in accordance with the invention, the embedded flash memory of the microcomputer is partitioned into two blocks: a loader block and a user block, respectively used to store the loader program and the application programs. This allows the data reprogramming process to be carried out through the microcomputer itself without having to use external reprogramming tools.

(2) Second, the invention allows the microcomputer to perform an on-chip programming process without having to use a dedicated control circuit. This allows the microcomputer to be highly integrated and small in chip size. (3) Third, the loader block and the user block are partitioned from the same embedded flash memory unit, of which the loader block is used to store the loader program, without having to use an additional ROM unit to store the loader program. Since the loader block and the user block can share the same I/O circuit of the embedded flash memory for I/O functions, the overall circuit structure is considerably less complex. This permits high integration, compactness in chip size, and cost-effective implementation. It furthermore design and debugging are both easily carried out by the developer.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A microcomputer having an on-chip programming capability, the microcomputer comprises:

an embedded flash memory unit that is partitioned into at least two blocks including:
a loader block for storing a loader program; and
a user block, having the same starting address as the loader block, for storing at least one application program;

a microprocessor unit coupled to the embedded flash memory unit, the microprocessor unit including a timer capable of generating an interrupt signal when a preset time period elapses;

a register set for temporarily storing the data to be programmed into the user block of the embedded flash memory unit; and a bus multiplexer coupled between the microprocessor unit, the embedded flash memory unit, and the register set, in order to selectively connect the embedded flash memory unit to either the microprocessor unit or the register set in response to a bus selection signal issued by the microprocessor unit;

wherein when performing a data reprogramming process, the microprocessor unit selects the loader block of the embedded flash memory unit as the active block while instructing the bus multiplexer to connect the loader block of the embedded flash memory unit to the microprocessor unit, allowing the microprocessor unit to fetch and execute the loader program stored in the loader block of the embedded flash memory unit;

when performing the data reprogramming process, externally received data are first transferred to and temporarily stored in the register set and the time period required to write one block of data into the user block of the embedded flash memory unit is set to the timer in the microprocessor unit; and wherein when the microprocessor unit subsequently is switched to an idle mode and selects the user block of the embedded flash memory unit as the active block, it also instructs the bus multiplexer to connect the user block of the embedded flash memory unit to the register set, allowing the data currently stored in the register set to be transferred to and written into the user block of the embedded flash memory unit; and when the preset period of time elapses and the timer generates the interrupt signal, the interrupt signal causes the microprocessor unit to wake up from the idle mode and resume operation.

2. The microcomputer of claim 1, wherein the embedded flash memory unit further includes an I/O circuit that is shared by both the loader block and the user block of the embedded flash memory unit for I/O functions.

3. The microcomputer of claim 2, wherein the microprocessor unit issues a memory selection signal to the embedded flash memory unit to select either the loader block or the user block of the embedded flash memory unit as the active block connected to the I/O circuit.

4. The microcomputer of claim 3, wherein the microprocessor unit further includes an I/O port for receiving the data to be programmed into the user block of the embedded flash memory unit.

5. The microcomputer of claim 4, wherein the register set includes:

a data register for storing the data to be programmed into the user block of the embedded flash memory unit;

an address register for storing the associated addresses of the data to be programmed into the user block of the embedded flash memory unit; and a control register for storing the control instructions related to the programming of the data into the user block of the embedded flash memory unit.

6. The microcomputer of claim 5, wherein the microprocessor unit operates in a programming mode and an execution mode, such that when in the programming mode, the microprocessor unit fetches and executes the loader program stored in the loader block of the embedded flash memory unit, and when in the execution mode, the microprocessor unit fetches and executes the application program stored in the user block of the embedded flash memory unit.

7. The microcomputer of claim 6, wherein when the microprocessor unit operates in the programming mode, the microprocessor unit issues a memory selection signal to the embedded flash memory unit to select the loader block as the active block, and also issues a bus selection signal to the bus multiplexer causing the bus multiplexer to connect the active block of the embedded flash memory unit to the microprocessor unit, allowing the microprocessor unit to execute the loader program stored in the loader block of the embedded flash memory unit.

8. The microcomputer of claim 7, wherein when the microprocessor unit operates in the execution mode, the microprocessor unit issues a memory selection signal to the embedded flash memory unit to select the user block as the active block, and also issues a bus selection signal to the bus multiplexer to cause the bus multiplexer to connect the active block of the embedded flash memory unit to the microprocessor unit, allowing the microprocessor unit to execute the application program stored in the user block of the embedded flash memory unit.

9. The microcomputer of claim 8, wherein when the microprocessor unit operates in the idle mode, if the control instruction stored in the control register is set to programming mode, the data currently stored in the data register are transferred to and written into the user block of the embedded flash memory unit at locations specified by the address values stored in the address register.

10. The microcomputer of claim 9, wherein the microprocessor unit, prior to entering into the idle mode, enables an interrupt function that allows the microprocessor unit to be interrupted by the interrupt signal generated by the timer.

11. The microcomputer of claim 10, wherein the microprocessor unit, prior to entering into the idle mode, checks the time period required to write the new data into the user block of the embedded flash memory unit and then set the timer accordingly.

12. The microcomputer of claim 11, wherein when the microprocessor unit operates in the execution mode, it enters the idle mode after the interrupt function is enabled and the timer is set, and when the timer reaches the preset time, the timer generates an interrupt signal to wake up the microprocessor unit from the idle mode and cause the microprocessor to enter the programming mode.

13. The microcomputer of claim 12, wherein when the microprocessor unit operates in the programming mode, the microprocessor unit is switched into the execution mode after the instruction to enter the execution mode is set and the microprocessor unit is restarted.

14. A microcomputer having an on-chip programming capability, which comprises:

an embedded flash memory unit that is partitioned into at least two blocks including:

a loader block for storing a loader program; and a user block, having a starting address following immediately after the last address of the loader block, for storing at least one application program;

a microprocessor unit coupled to the embedded flash memory unit, the microprocessor unit including a timer capable of generating an interrupt signal when a preset time period elapses after the timer is started;

a register set for temporarily storing the data to be programmed into the user block of the embedded flash memory unit; and a bus multiplexer coupled between the microprocessor unit, the embedded flash memory unit, and the register set, for selectively connecting the embedded flash memory unit to either the microprocessor unit or the register set in response to a bus selection signal issued by the microprocessor unit;

wherein when performing a data reprogramming process, the microprocessor unit selects the loader block of the embedded flash memory unit as the active block and meanwhile instructs the bus multiplexer to connect the loader block of the embedded flash memory unit to the microprocessor unit, allowing the microprocessor unit to fetch and execute the loader program stored in the loader block of the embedded flash memory unit;

when performing the data reprogramming process, externally received data are first transferred to and temporarily stored in the register set and the period of time required to write one block of data into the user block of the embedded flash memory unit is used to set the timer in the microprocessor unit; and subsequently, the microprocessor unit is switched to an idle mode and then selects the user block of the embedded flash memory unit as the active block and meanwhile instructs the bus multiplexer to connect the user block of the embedded flash memory unit to the register set, allowing the data currently stored in the register set to be transferred to and written into the user block of the embedded flash memory unit, while at the time the timer generates an interrupt signal when the preset period of time elapses after the timer is started, and the interrupt signal causes the microprocessor unit to wake up from the idle mode and resume operation.

15. The microcomputer of claim 14, wherein the embedded flash memory unit further includes:

an I/O circuit which is shared by both the loader block and the user block of the embedded flash memory unit for I/O functions.

16. The microcomputer of claim 15, wherein the microprocessor unit further includes:

an I/O port for receiving the data to be programmed into the user block of the embedded flash memory unit.

17. The microcomputer of claim 16, wherein the register set includes:

a data register for storing the data to be programmed into the user block of the embedded flash memory unit;

an address register for storing the associated addresses of the data to be programmed into the user block of the embedded flash memory unit; and a control register for storing the control instructions related to the programming of the data into the user block of the embedded flash memory unit.

18. The microcomputer of claim 17, wherein the microprocessor unit operates in a programming mode and an execution mode, such that when in the programming mode, the microprocessor unit fetches and executes the loader program stored in the loader block of the embedded flash memory unit, and when in the execution mode, the microprocessor unit fetches and executes the application program stored in the user block of the embedded flash memory unit.

19. The microcomputer of claim 18, wherein when the microprocessor unit operates in the programming mode or the execution mode, the microprocessor unit issues a bus selection signal to the bus multiplexer to cause the bus multiplexer to connect the currently addressed block of the embedded flash memory unit to the microprocessor unit.

20. The microcomputer of claim 19, wherein when the microprocessor unit operates in the idle mode, if the control instruction stored in the control register is set to programming mode, the data currently stored in the data register are transferred to and written into the user block of the embedded flash memory unit at locations specified by the address values stored in the address register.

21. The microcomputer of claim 20, wherein the microprocessor unit, prior to entering into the idle mode, enables an interrupt function that allows the microprocessor unit to be interrupted by the interrupt signal generated by the timer.

22. The microcomputer of claim 21, wherein the microprocessor unit, prior to entering the idle mode, checks the period of time required to write the new data into the user block of the embedded flash memory unit and then set the timer accordingly.

23. The microcomputer of claim 22, wherein when the microprocessor unit operates in the execution mode, it enters into the idle mode after the interrupt function is enabled and the timer is set, and when the timer reaches the preset time, the timer generates an interrupt signal to wake up the microprocessor unit from the idle mode and the microprocessor enter the programming mode.

24. The microcomputer of claim 23, wherein when the microprocessor unit operates in the programming mode, the microprocessor unit is switched into the execution mode after the instruction to enter the execution mode is set and the microprocessor unit is restarted.

25. A method for use on a microcomputer having a microprocessor unit including a timer capable of generating an interrupt signal, an embedded flash memory unit, and a register set to perform an on-chip programming process for programming a set of new data into the embedded flash memory unit, the method comprising the steps of:

(1) partitioning the embedded flash memory unit into a loader block for storing a loader program and a user block for storing at least one application program;

(2) switching the microprocessor unit to a programming mode, and sending a signal by the microprocessor unit to select the loader block of the embedded flash memory as the active block and to connect the loader block to the microprocessor unit;

(3) executing the loader program stored in the loader block of the embedded flash memory unit by the microprocessor unit;

(4) setting parameters related to the programming of the new data into the embedded flash memory unit;

(5) externally receiving and temporarily storing the new data into the register set;

(6) setting the timer in the microprocessor unit with the period of time required to program one block of the new data into the user block of the embedded flash memory unit;

(7) switching the microprocessor unit to an idle mode, and sending a signal by the microprocessor unit to select the user block of the embedded flash memory as the active block and to connect the user block to the register set;

(8) writing the currently received block of data into the user block of the embedded flash memory unit;

(9) upon receiving the interrupt signal from the timer, waking up the microprocessor unit from the idle mode;

(10) checking whether all the blocks of the new data have been programmed into the user block of the embedded flash memory unit; if not, returning to the step (5).

26. The method of claim 25, further comprising the step of checking whether a request for data reprogramming process is received; if not, instructing the microprocessor unit to execute the application program stored in the user block of the embedded flash memory unit.

27. The method of claim 26, wherein the step (5) comprises the substep of writing the new data and the address values associated with the new data into a register set.

28. The method of claim 27, wherein the new data are received first via an I/O port of the microprocessor unit and then transferred to the register set.

29. The method of claim 28, further comprising the steps of:

checking the period of time required to program one block of data into the user block of the microprocessor unit; and setting a timer in the microprocessor unit with the period of time, the timer being capable of generating an interrupt signal to the microprocessor unit when the preset period of time elapses after the timer is started.

30. The method of claim 29, wherein the step (2) of switching the microprocessor unit to the programming mode includes the substeps of:

initializing the programming mode;

enabling the interrupt function of the microprocessor unit;

setting the timer with the period of time required to program one block of data into the user block of the microprocessor unit, the timer being capable of generating an interrupt signal when a preset period of time elapses after the timer is started;

starting the timer;

switching the microprocessor unit into idle mode;

upon receiving the interrupt signal from the timer, waking up the microprocessor unit from the idle mode;

stopping the timer; and disabling the interrupt function of the microprocessor unit.

31. The method of claim 30, further comprising, prior to the step (4) of setting parameters, the step of checking whether the programming mode is readily entered, and if it is not, reinitializing the programming mode.

32. The method of claim 31, wherein the step (6) of writing data includes the substeps of:

enabling the interrupt function of the microprocessor unit;

starting the timer;

switching the microprocessor unit into idle mode;

transferring the data currently stored in the register set to the user block of the embedded flash memory unit, and then writing these data into the user block of the embedded flash memory unit;

upon receiving the interrupt signal from the timer, waking up the microprocessor unit from the idle mode;

stopping the timer; and disabling the interrupt function of the microprocessor unit.

33. The method of claim 32, further comprising the step of checking whether the data reprogramming process is completed; if yes, setting the instruction to enter the execution mode, and then restarting the microprocessor unit.

* * * * *